Patented Oct. 23, 1951

2,572,559

UNITED STATES PATENT OFFICE 2,572,559

PROCESS OF IMPROVING CELLULOSE ETHERS

James P. Chittum, Waterbury, Conn., assignor to United States Rubber Company, New York, N. Y., a corporation of New Jersey No Drawing. Application July 11, 1947,
Serial No. 760,514

3 Claims. (Cl. 106—187)

This invention relates to a process of improving the properties of cellulose ethers, particularly of shaped bodies or articles formed from plasticized cellulose ethers. More particularly the invention relates to increasing the strength of plasticized cellulose ethers, especially the tensile strength when measured at room temperature, or at an elevated temperature (conveniently 212° F.), or after soaking in water, and at the same time increasing the elongation at break without loss of other desirable properties such as flexibility and tear resistance.

Previously cellulose ethers, particularly ethyl cellulose and benzyl cellulose, have been used in coating compositions and particularly in making shaped or molded articles including films and bodies formed by extrusion, compression or injection molding. They have been formulated as molding compositions. Plasticized ethyl cellulose has also been proposed as a substitute for rubber in certain applications. However, the properties of bodies or articles shaped or formed from plasticized cellulose ethers have not been entirely satisfactory. For example, the toughness, hardness, strength, wear-resistance and resistance to temperature variations have not been desirably high. The tensile strength of the shaped articles, particularly after prolonged contact with water, and the elongation at break have been undesirably low. The cold flow of the products has been undesirably high. These observations have led me to conclude that if a method of toughening or "curing" cellulose ether compositions and articles could be developed, bodies and articles made from cellulose ethers would be much improved.

The principal object of the present invention is to provide a process of improving the physical and mechanical properties of plasticized cellulose ethers. Another object is to provide a process of increasing the tensile strength, especially the wet tensile strength, of articles formed from such ethers. Another object is to provide a method of decreasing the cold flow of such articles. Another object is to greatly improve the toughness, wear-resistance and similar properties of such articles. Many other objects will more fully hereinafter appear.

In its broadest aspect the present invention resides in the discovery that the properties, especially the physical and mechanical properties, of cellulose ethers can be greatly improved by incorporating therewith any of certain oxidizing agents, with or without any of certain acid-reactive organic materials, and heating the resulting mixture to effect curing of said cellulose ether. The invention is broadly applicable to cellulose ethers but is especially applicable to plasticized cellulose ethers. Thus, I have discovered that the physical and mechanical properties of bodies formed from plasticized cellulose ethers can be greatly improved by intimately and homogeneously incorporating with the plasticized cellulose ether, prior to imparting thereto the desired shape, a minor proportion of an oxidizing agent of the class set forth herein at a temperature not higher than 150° F., shaping the resulting material and heating the shaped body at a curing temperature of at least 200° F. for a period of time sufficient to effect a "curing" reaction between the cellulose ether and the oxidizing agent, thereby bringing about the desired improvement in physical properties of the shaped article.

The oxidizing agent used in practicing the present invention is selected from the group consisting of alkali metal and ammonium chromates and dichromates, chromium trioxide, alkali metal persulfates, alkali metal and alkaline earth metal hypochlorites, and benzoyl peroxide, specific examples of which include sodium dichromate, chromic acid ($CrO_3$), ammonium chromate, potassium peroxydisulfate, calcium hypochlorite, and benzoyl peroxide. Sodium dichromate is preferred as the oxidizing agent on the grounds of cheapness, availability and results obtained.

The amount of the oxidizing agent may vary within wide limits so long as it is employed in minor proportion, generally from 0.5% to 10%, with reference to the cellulose ether. In the case of sodium dichromate I prefer to use it in amount ranging from 0.75% to 5.0% of the weight of cellulose ether.

The product resulting from treatment in accordance with the foregoing has markedly superior tensile strength and lower cold flow than untreated plasticized cellulose ether.

I have further found that still better results can be obtained by the employment, in conjunction with the oxidizing agent, of a small amount of an acid-reactive material such as tetra-chloro-p-benzoquinone or a relatively strongly acidic organic material such as sulfamic acid, para-toulenesulfonis acid, trichlorobutyric acid, the reaction product of a chloride of an amphoteric metal such as aluminum chloride with a substantially water-insoluble secondary aromatic amine such as phenyl beta-naphthylamine, etc. The incorporation of the acid-reactive material alone, without oxidizing agent, I have found to be of no benefit.

The acid-reactive material is always employed in minor proportion, generally in amount not exceeding 10% by weight of the cellulose ether, and preferably the amount thereof lies within the range of from 0.25 to 10% by weight based on the weight of cellulose ether. The amount may vary with the particular cellulose ether, with the type and amount of oxidizing agent employed, etc. The selection of a suitable amount will be well within the skill of the art in the light of this disclosure.

The cellulose ether employed will generally be ethyl cellulose since this is the cellulose ether most common commercially at the present time. However, any cellulose ether may be employed in practicing the present invention. Examples are those water-insoluble alkyl celluloses wherein the alkyl groups are ethyl or higher such as ethyl, propyl, butyl, etc., aryl celluloses such as phenyl cellulose, methylphenyl cellulose, etc., aralkyl celluloses such as benzyl cellulose. Since benzyl cellulose has attained commercial importance at the present time it is the principal cellulose ether other than ethyl cellulose to which the present invention would be applied.

The process of the present invention may be applied to methyl cellulose with good results. It is preferred to apply it to the water-insoluble cellulose ethers which comprehend those enumerated in the preceding paragraph, since water-insoluble cellulose ethers are most commonly used for plastics. However the invention may be applied to decrease the water-solubility of methyl cellulose and of the normally water-soluble grades of ethyl cellulose, thereby greatly enhancing their usefulness in the plastics art.

Plasticizers must be added to enable the cellulose ethers to be handled by methods and on machinery commonly used with rubber and to be suitably flexible subsequent to curing. A wide variety of materials can be used as plasticizers, as is well known to the art. These include castor oil, dibutyl sebacate, dibutyl phthalate and other esters. The choice of plasticizer is largely determined by the conditions of service which the cured material must meet. Any plasticizer known to be suitable for use with the particular cellulose ether employed may be used. The selection of the plasticizer constitutes no part of the present invention which is applicable to cellulose ether plasticized with any plasticizer. Generally the cellulose ether is mixed with the plasticizer before incorporation of the oxidizing agent, with or without the acid-reactive material. Plasticization of the cellulose ether may be accomplished in any suitable manner and constitutes no part of the present invention. Generally it is accomplished in the customary way by breaking the cellulose ether down on a rubber mill at an elevated temperature and adding the plasticizer gradually with continued milling until a uniform homogeneous mixture is obtained. The proportion of plasticizer employed with reference to the cellulose ether may, as is well known in the art, vary within wide limits and the selection of the proportion thereof forms no part of the present invention.

If desired, the cellulose ether and the plasticizer may be mixed together prior to the milling step and then milled together, instead of the ether being first broken down and then mixed with the plasticizer. The plasticized cellulose ether treated in accordance with the present invention may comprise any of the usual filler materials. The selection of a suitable filler and the amount thereof are well within the skill of the art and constitutes no part of the present invention. Carbon black, diatomaceous earth, cotton fibers, especially cotton linters, asbestos, or any other suitable filler material may be employed. The proportion of filler material employed may vary over wide limits as is well known to those in the art. The filler material may be incorporated after the plasticizer has been incorporated with the cellulose ether.

The oxidizing agent, or the oxidizing agent and the acid-reactive material, is incorporated uniformly into the plasticized cellulose ether in any suitable manner. Preferably this is accomplished by milling on a rubber mill, at a temperature not higher than 150° F., to avoid setting up, or premature curing, of the stock on the mill.

Following the incorporation of the oxidizing agent with or without the acid-reactive material, the mixture is given the desired shape in any of the ways known in the art, for example by shaping into a foil or film, extruding, injection molding, compression molding, etc.

The material is next subjected to heating at a temperature of at least 200° F. for a period of time sufficient to bring about curing of the cellulose ether which is the primary aim and object of the present invention, and which gives the cellulose ether product greatly improved physical and mechanical properties. The curing step of my invention may be carried out in any suitable manner and in any suitable equipment. The curing step is generally carried out under conditions which are similar to those employed for curing rubber. The temperature and time of heating to effect the cure are inter-related in such manner as to effect the desired results. Generally the curing operation is carried out at a temperature of 200 to 300° F. The length of time of cure should be sufficient to bring about the desired improvement in the physical and mechanical properties of the cellulose ether, and generally ranges from 15 to 60 minutes. For example, when curing at 200° F., the length of time may be about 60 minutes, whereas when curing at 300° F. the length of time of cure may be 15 minutes. A very satisfactory cure can be effected at a temperature of substantially 240° F. for about 30 minutes.

Following are non-limiting specific examples illustrating the practice of the present invention.

In Examples 1 to 19 all parts are by weight. The ethyl cellulose used in Examples 1 to 16 and 20 was a water-insoluble grade known in the art as 100 C. P. S. standard. The benzyl cellulose used in Examples 17 to 19 was the ordinary benzyl cellulose of commerce. However, I am not limited to the particular cellulose ethers or the particular materials and condtiions used in the examples, which are illustrative merely. The samples in Examples 1 to 19 were prepared and tested as follows:

The cellulose ether, for example 100 parts of ethyl cellulose, was broken down on a rubber mill at approximately 250° F. A plasticizer, namely 60 parts of dibutyl sebacate, was then added gradually and milling was continued until the plasticized was dispersed uniformly throughout the cellulose ether. The temperature was reduced after plasticization was completed. During this time filling material may be added if desired. In each of the examples 20 parts of carbon black were thus added. When the temperature reached approximately 150° F. the oxidizing agent alone, or the oxidizing agent and the acid-reactive material, were added in the amounts given in the table below. Samples for testing were cured by heating the resulting mixture in a slab mold at about 250° F. for about 30 minutes.

Tensile strength tests were run at room temperature, at 212° F., and after soaking in water for 24 hours. These tests are referred to below as "green tensile," "212° F. tensile," and "water-soaked tensile," respectively.

Cold flow compression set under constant load was determined by the regular A. S. T. M. method (D395-37T-Method A).

and benzoyl peroxide (Example 14) improve 212° F. and water-soaked tensiles. Calcium hypochlorite (Example 15) improves green, 212° F. and water-soaked tensiles. A combination of calcium hypochlorite and tetrachlorobenzoquinone (Example 16) is better than calcium hypochlorite alone.

Examples 17, 18 and 19 show that benzyl cellulose is definitely improved by sodium dichromate and still further improved by a combination of sodium dichromate and tetrachlorobenzoquinone, indicating that the materials used to improve ethyl cellulose in accordance with the present invention can be applied to cellulose ethers generally.

*Examples 1–19*

| Example | Added materials, pts. per 100 pts. cellulose ether | Elongation at break, per cent | Green tensile (p. s. i.) | 212° F. tensile (p. s. i.) | Water soaked tensile (p. s. i.) | Cold flow, per cent |
|---|---|---|---|---|---|---|
| | ETHYL CELLULOSE | | | | | |
| 1 | none | 40 | 630 | 0 | 270 | 78.6 |
| 2 | 0.75 sodium dichromate | 110 | 1,100 | 20 | 725 | 80.0 |
| 3 | 1.5 sodium dichromate | 80 | 1,500 | 75 | 985 | 69.1 |
| 4 | 3.0 sodium dichromate | 80 | 1,200 | 75 | 815 | 71.5 |
| 5 | 5.0 sodium dichromate | 110 | 837 | 15 | 535 | 73.8 |
| 6 | 3.0 sodium dichromate / 7.0 tetrachlorobenzoquinone | 80 | 1,000 | 105 | 960 | 65.5 |
| 7 | 5.0 sodium dichromate / 7.0 tetrachlorobenzoquinone | 110 | 1,200 | 50 | 863 | 40.6 |
| 8 | 1.5 sodium dichromate [1] / 2 trichlorobutyric acid [1] | 70 | 1,300 | 105 | 975 | 65.2 |
| 9 | 1.5 sodium dichromate / 2.0 sulfamic acid | 70 | 1,000 | 45 | 710 | 72.1 |
| 10 | 1.5 sodium dichromate / 0.5 p-toluenesulfonic acid | 110 | 1,100 | 50 | 690 | 75.2 |
| 11 | 1.2 chromium trioxide | 80 | 625 | 25 | 370 | 78.5 |
| 12 | 3.0 ammonium chromate | 80 | 1,500 | 60 | 800 | 62.7 |
| 13 | 1.5 potassium peroxydisulfate | 50 | 680 | 45 | 370 | 81 |
| 14 | 1.5 benzoyl peroxide | 70 | 610 | 20 | 380 | 76.8 |
| 15 | 3.0 calcium hypochlorite | 60 | 932 | 20 | 385 | 81.3 |
| 16 | 3.0 calcium hypochlorite / +0.4 tetrachlorobenzoquinone | 80 | 1,300 | 25 | 445 | 79.2 |
| | BENZYL CELLULOSE | | | | | |
| 17 | none | 110 | 30 | 0 | 10 | 100 |
| 18 | 3 sodium dichromate | 90 | 150 | 10 | 80 | 94.6 |
| 19 | 3 sodium dichromate [1] / 7 tetrachlorobenzoquinone [1] | 100 | 360 | 40 | 270 | 88.7 |

[1] Preferred combinations.

Consideration of Examples 1 to 5 shows that curing of ethyl cellulose with 0.75% of sodium dichromate improves the physical properties to a marked degree. Optimum results are obtained with from 1.5 to 3.0 per cent by weight of sodium dichromate based on the weight of ethyl cellulose. Comparison of Examples 4 and 5 with Examples 6 and 7, respectively, indicates that the conjoint use of tetrachlorobenzoquinone with sodium dichromate produces a further definite improvement in physical properties.

Comparison of Example 8 with Example 3 shows that a combination of trichlorobutyric acid and sodium dichromate produces higher 212° F. tensile and lower cold flow than sodium dichromate alone.

Comparing Examples 11 and 12 respectively with the control Example 1 shows that chromic trioxide improves both 212° F. tensile and water-soaked tensile, and that ammonium chromate produces a definite overall improvement in physical properties.

Of the compounds other than chromium compounds, potassium peroxydisulfate (Example 13)

*Example 20*

The following ingredients were employed in the following proportions by weight:

| | Parts |
|---|---|
| Ethyl cellulose | 100 |
| Castor oil | 100 |
| Glycerine | 10 |
| Sodium dichromate | 1 |
| Reaction[1] product of aluminum chloride and phenyl beta-naphthylamine | 5 |

[1] May be made by stirring 1 part, by weight, of anhydrous aluminum chloride into 5 parts, by weight, of molten phenyl beta-naphthylamine, stirring the mixture until it solidifies and pulverizing the solid to a powder.

The ethyl cellulose, the castor oil and the glycerine were first milled together on the rubber mill to give an intimate mixture. Sodium dichromate and the reaction product of aluminum chloride and phenyl beta-naphthylamine were then added at a temperature of not over 150° F. with continued milling to obtain a uniform mixture. A sample of the resulting mixture was then cured by heat in a mold of the compression type for 30 minutes at 240° F. A similar compound was prepared with the exception that the sodium dichromate and the reaction product of aluminum chloride and phenyl beta-naphthylamine combination were omitted. The properties of the two compounds are compared below.

| | With Curative | No Curative |
|---|---|---|
| Elongation at break (—per cent) | 110 | 90 |
| Tensile green (p. s. i.) | 964 | 670 |
| Tensile, 212° F. (p. s. i.) | 35 | 16 |
| Tensile, water-soaked (p. s. i.) | 610 | 411 |
| Shore Durometer, Type A | 74 | 78 |
| Cold Flow, per cent | 83.4 | 85.4 |
| Tear (lbs.) | 1.7 | 2.1 |
| Brittle point °F | —19 | —19 |

It is apparent from the tables that the use of these curatives markedly increased the elongation at break, green tensile strength, 212° F. tensile strength, and the water-soaked tensile strength. The cold flow was substantially reduced by the curing operation. At the same time other properties were not adversely effected.

From the foregoing it will be seen that the present invention provides a useful and economical method of improving properties of articles formed of cellulose ethers. The poor tensile strength and the high cold flow of plasticized cellulose ethers are disadvantageous in most applications. Commercial use of plasticized cellulose ethers has been drastically limited by the high cold flow and low tensile strength of the products. These limitations are largely removed by treatment according to the present invention. The oxidizing agent, or the oxidizing agent and the acid-reactive material, are easily incorporated by milling at a suitable low temperature in order to avoid premature curing during the incorporation. Thereafter the material may be formed into the desired shape and cured in a manner resembling the method commonly employed in curing resinous compositions, rubber, or the like. Equipment which is standard in the plastic and rubber industry is used without change for carrying out the incorporation and curing steps of the present invention. The invention is particularly useful in the manufacture of articles such as hose, gas masks, and the like. Many other advantages of the present invention will be obvious to those skilled in the art.

Having thus described my invention, what I claim and desire to protect by Letters Patent is:

1. The process of improving the properties of plasticized water-insoluble cellulose ethers which comprises incorporating therewith by milling from 0.5% to 10% by weight, based on the weight of said cellulose ether, of an oxidizing agent consisting of sodium dichromate and from 0.25% to 10% by weight, based on the weight of said cellulose ether, of tetrachloro-p-benzoquinone at a temperature not higher than 150° F., shaping the resulting mixture containing said sodium dichromate and said tetrochloro-p-benzoquinone, and heating the resulting shaped body containing said sodium dichromate and said tetrochloro-p-benzoquinone at a temperature of at least 200° F. for a period of time sufficient to effect curing of said cellulose ether.

2. As a new article of manufacture, a material resulting from the heat-curing at a temperature of at least 200° F. of a shaped homogeneous milled mixture of a plasticized water-insoluble cellulose ether, from 0.5% to 10% by weight based on the weight, of said cellulose ether, of an oxidizing agent consisting of sodium dichromate and from 0.25% to 10% by weight, based on the weight of said cellulose ether, of tetrachloro-p-benzoquinone, said heat-cured material exhibiting substantially greater tensile strength and elongation at break than said plasticized cellulose ether without said sodium dichromate and tetrachloro-p-benzoquinone.

3. As a new article of manufacture, a material resulting from the heat-curing at a temperature of at least 200° F. of a shaped homogeneous milled mixture of plasticized water-insoluble ethyl cellulose, an oxidizing agent consisting of sodium dichromate in amount equal to approximately 5 parts per 100 parts of said ethyl cellulose, and tetrachloro-p-benzoquinone in amount equal to approximately 7 parts per 100 parts of said ethyl cellulose, said heat-cured material exhibiting considerably greater tensile strength green and tensile strength at 212° F., considerably greater water soaked tensile strength, considerably greater elongation at break and considerably lower cold flow than said plasticized ethyl cellulose without said sodium dichromate and tetrachloro-benzoquinone.

JAMES P. CHITTUM.

REFERENCES CITED

The following references are of record in the file of this patent:

UNITED STATES PATENTS

| Number | Name | Date |
|---|---|---|
| 612,066 | Stevens | Oct. 11, 1898 |
| 1,948,517 | Dreyfus | Feb. 27, 1934 |
| 2,109,496 | Martin et al. | Mar. 1, 1938 |
| 2,109,509 | Schneider | Mar. 1, 1938 |
| 2,300,458 | Mazzucchelli | Nov. 3, 1942 |
| 2,422,572 | Lilienfeld | June 17, 1947 |
| 2,465,915 | Myles | Mar. 29, 1949 |
| 2,471,272 | Hooker | May 24, 1949 |

OTHER REFERENCES

"Dictionary of Applied Chemistry," Thorpe (1924) vol. V, page 566.